(12) United States Patent
Nemati et al.

(10) Patent No.: US 12,248,369 B2
(45) Date of Patent: Mar. 11, 2025

(54) DECODING STATUS FLAG TECHNIQUES FOR MEMORY CIRCUITS

(71) Applicant: Apple Inc., Cupertino, CA (US)

(72) Inventors: Farid Nemati, Los Altos Hills, CA (US); Steven R. Hutsell, San Jose, CA (US); Gregory S. Mathews, Saratoga, CA (US); Yi Chun Chen, San Jose, CA (US); Kevin C. Wong, Los Altos, CA (US); Kalpana Bansal, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/323,178

(22) Filed: May 24, 2023

(65) Prior Publication Data

US 2023/0325274 A1 Oct. 12, 2023

Related U.S. Application Data

(63) Continuation of application No. 17/804,932, filed on Jun. 1, 2022, now Pat. No. 11,829,242.
(Continued)

(51) Int. Cl.
*G06F 11/10* (2006.01)
*G06F 11/07* (2006.01)

(52) U.S. Cl.
CPC ........ *G06F 11/1064* (2013.01); *G06F 11/076* (2013.01); *G06F 11/0772* (2013.01); *G06F 11/106* (2013.01)

(58) Field of Classification Search
CPC .............. G06F 11/1064; G06F 11/076; G06F 11/0772; G06F 11/106; G06F 11/1048
See application file for complete search history.

(56) References Cited

U.S. PATENT DOCUMENTS 6,519,736 B1  2/2003  Chen et al.
9,071,273 B2  6/2015  Resnick
(Continued)

FOREIGN PATENT DOCUMENTS

JP    2012-532372 A    12/2012

OTHER PUBLICATIONS

International Search Report and Written Opinion in PCT Appl. No. PCT/US2023/010657 mailed May 9, 2023, 10 pages.
(Continued)

*Primary Examiner* — Thien Nguyen
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to improving memory reliability. In some embodiments, memory circuitry includes memory cells configured to store data, interface circuitry, and on-die error correcting code (ECC) circuitry. The ECC circuitry may check read data from the memory cells for errors and correct detected correctable errors to generate corrected data. The memory circuitry may provide read data to a requesting circuit via the interface circuitry, including one or more sets of corrected data from the on-die ECC circuitry. The memory circuitry may provide a decoding status flag (DSF) via the interface circuitry, including to: set the DSF to a first value in response to no error being detected for a given set of provided read data, set the DSF to a second value in response to a correctable error that was detected and corrected by the on-die ECC circuitry to provide a given set of read data, and set the DSF to a third value in response to an uncorrectable error detected by the on-die ECC circuitry.

16 Claims, 15 Drawing Sheets

Related U.S. Application Data

(60) Provisional application No. 63/267,546, filed on Feb. 4, 2022.

(56) References Cited

U.S. PATENT DOCUMENTS

| | | |
|---|---|---|
| 10,481,975 B2 | 11/2019 | Saida et al. |
| 11,934,265 B2 | 3/2024 | Nemati |
| 2017/0131947 A1 | 5/2017 | Hoang et al. |
| 2017/0372799 A1 | 12/2017 | Bacchus |
| 2020/0004628 A1 | 1/2020 | Ben-Rubi et al. |
| 2020/0285550 A1 | 9/2020 | Vrabel et al. |
| 2020/0371873 A1 | 11/2020 | Schaefer et al. |
| 2021/0055985 A1 | 2/2021 | Lee et al. |
| 2021/0224155 A1 | 7/2021 | Bains et al. |
| 2021/0350870 A1 | 11/2021 | Ware et al. |
| 2021/0357287 A1* | 11/2021 | Kim .................. H03M 13/1575 |
| 2022/0374309 A1* | 11/2022 | Kim .................... G06F 11/1048 |

OTHER PUBLICATIONS

Office Action in U.S. Appl. No. 17/804,950 mailed Aug. 4, 2023, 12 pages.

* cited by examiner

Example CE Tracker Data Structure 620

| Valid | Physical address | Client identifier | Count |
|---|---|---|---|
| ... | ... | ... | ... |

DECODING STATUS FLAG TECHNIQUES FOR MEMORY CIRCUITS

CROSS-REFERENCE TO RELATED APPLICATIONS

The present application is a continuation of U.S. application Ser. No. 17/804,932, entitled "Data Corruption Tracking for Memory Reliability", filed Jun. 1, 2022, which claims priority to U.S. Provisional Application No. 63/267,546, entitled "Data Corruption Tracking for Memory Reliability," filed Feb. 4, 2022.

This application is related to the U.S. application Ser. No. 17/804,950 filed on Jun. 1, 2022.

Each of the above-referenced applications is hereby incorporated by reference as if entirely set forth herein.

BACKGROUND

Technical Field

This disclosure relates generally to computer memory reliability and more particularly to tracking corrupt data and logging data errors.

Description of the Related Art

Reliability of data stored in memory is important in various computing contexts. In the data server context, various memory reliability features may be implemented, e.g., using redundant storage/interfaces, extensive ECC fields, etc. These techniques may not be appropriate in non-server contexts, e.g., because of power consumption and circuit area considerations. Increasing memory reliability may still be desirable in those contexts, however. Data may travel through various circuits, e.g., in a system-on-a-chip, and tracking the status of corrupted data as it moves through the system may be challenging. Further, it may be difficult to efficiently track and log memory errors and their sources.

DETAILED DESCRIPTION

Figure 1:
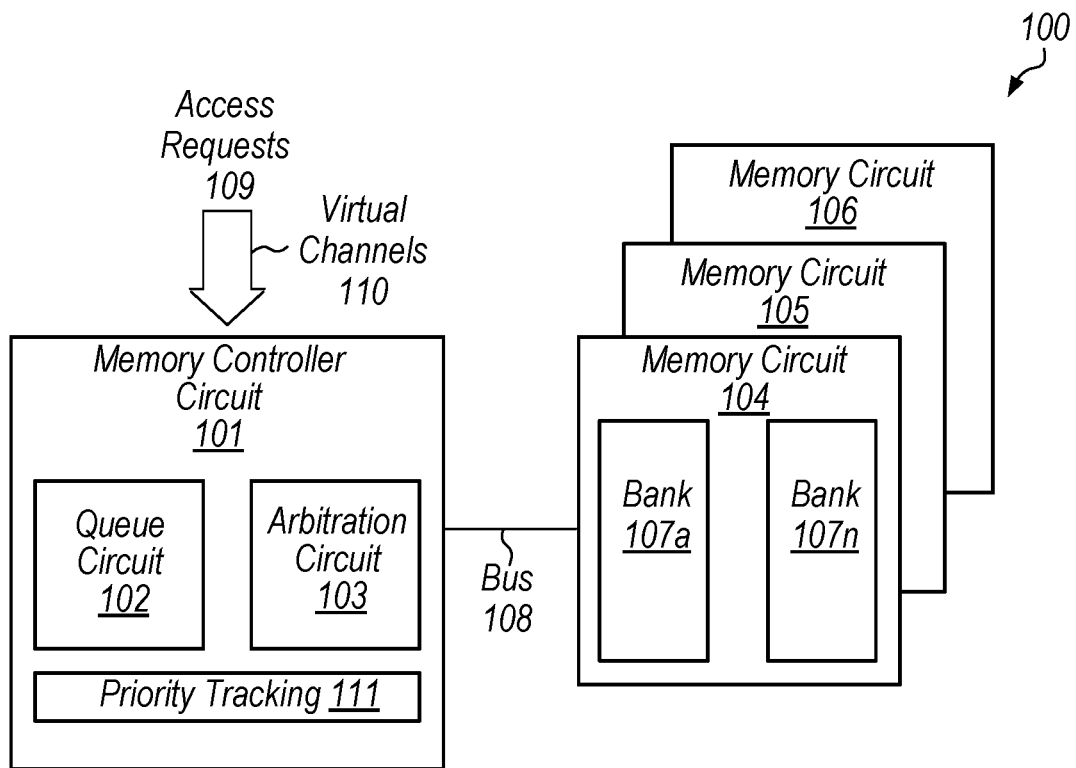
FIG. 1 is a generalized block diagram illustrating an exemplary memory system, according to some embodiments.

In disclosed embodiments discussed in detail below, a computing device is configured to track the corruption status of data that travels through various circuits (this status may be referred to herein as a corruption indicator or "poison" indicator, which may indicate a detected error that is not correctable) and log the memory errors encountered.

In some embodiments, a memory controller forces an uncorrectable error when writing poisoned data to memory circuitry (e.g., a DRAM) to maintain poisoned status when later reading the same location from the memory circuitry. This may allow tracking of poisoned data that is stored in the memory then retrieved, without requiring a dedicated memory cell field or a separate memory controller tracking structure. Generally, disclosed techniques may improve memory reliability with limited or negligible increase in area and power consumption.

In some embodiments, the memory is an LPDDR5 memory that is configured to detect both link errors and on-chip errors. The memory controller may force a write link error correction code (ECC) error to maintain the poison status in this context.

In some embodiments, the memory circuit is configured to correct correctable on-chip errors and indicate that a correctable error was corrected, e.g., via a decode status flag (DSF) interface to the memory controller. Note that a correctable error is a detected error for which error correction information (e.g., an using an ECC mechanism) provides enough information to correct the error (as opposed to a non-correctable error, which is detected but for which there is not enough information to make a correction). The memory circuit may correct the data in-flight and leave the incorrect data in the memory cell, however. Therefore, in some embodiments, demand scrub circuitry is configured to initiate an operation to cause an internal read/correct/write operation in the memory circuitry to correct the stored data. This may reduce the likelihood that a further error will occur that renders the data uncorrectable (e.g., a second bit flip in a memory that supports correction of a single bit flip but not multiple bit flips).

In some embodiments, the device is configured to track and log uncorrectable errors and correctable errors (e.g., via separate table structures) and may take various actions based on various error thresholds. In some embodiments, the device includes a memory cache and a memory cache controller, and the memory cache controller is configured to track the errors. In some embodiments, correctable and uncorrectable errors are also tracked at the source of errors (e.g., in certain processor clusters and their caches). The memory cache controller may aggregate error information and trigger various signals in response to certain thresholds. Various disclosed techniques may allow identification potential problems (e.g., a threshold count associated with a particular physical address may indicate a bad DRAM cell).

In various embodiments, disclosed techniques may advantageously improve memory reliability in devices in which server-grade memory reliability techniques would be impractical.

Overview of Memory System

FIG. 1 is a block diagram illustrating an exemplary memory system, according to some embodiments. In the illustrated embodiment, system 100 includes memory controller circuit 101 and a plurality of memory circuits 104-106 (note that any of various numbers of memory circuits may be implemented in other embodiments, and memory circuits may include various different numbers of banks per circuit). In the illustrated embodiment, memory controller circuit 101 is configured to communicate with memory circuits 104 via bus 108.

Memory control circuit 101, in the illustrated embodiment, receives access requests 109 via multiple virtual channels 110. In some embodiments, the virtual channels carry different types of requests and have different quality of service requirements. Requests from certain agents may be sent via a particular virtual channel, or an agent may be configured to send requests via multiple different virtual channels. In some embodiments, discussed in further detail below, the virtual channels include a real-time channel, a low-latency channel, and a bulk (or best-effort) channel.

Memory controller circuit 101, in the illustrated embodiment, includes a queue circuit 102, an arbitration circuit 103 and a priority tracking structure 111. Queue circuit 102, in some embodiments, is configured to queue received requests. Arbitration circuit 103, in some embodiments, is configured to select which requests are allowed to access certain memory banks 107. In some embodiments, arbitration circuit 103 is configured to use information in priority tracking structure 111 to determine which requests to grant.

In some embodiments, arbitration circuit 103 is configured to implement a category-based arbitration scheme. In some embodiments, each virtual channel is assigned a category value (e.g., C0 through C3, in some embodiments, although any of various numbers of categories may be implemented in other embodiments). Arbitration circuit 103 may assign each virtual channel a category for each bank. In some embodiments, each virtual channel begins at C3 for each bank and arbitration circuit 103 is configured to prioritize C3 channels over other channels. A least-recently-used (LRU) scheme may be used to pick from among virtual channels with the same category for a bank. In some embodiments, certain low-priority virtual channels are always provided a certain low category such as C1 or C0.

When a virtual channel wins arbitration and is granted an access to a particular bank, in some embodiments the memory controller 101 decrements its category for that bank (e.g., from C3 to C2 or from C2 to C1). In some embodiments, when a virtual channel has been reduced below a certain level for each bank for which it has requests (e.g., to C2 or below), the memory controller 101 is configured to increment all the categories for that virtual channel by one level (e.g., from C2 to C3). Note that when discussing "each" memory bank of a set of multiple memory banks herein, the disclosed techniques may be applied to the set of memory banks, but not necessarily all memory banks in the device or system. For example, other memory banks in the same device may be controlled by other memory controllers or devices.

In some embodiments, memory controller 101 also implements a credit system to allow a certain number of requests per virtual channel for a given read or write turn, e.g., based on requested or allocated bandwidth for the different virtual channels. This credit system may affect which virtual channels are actually sending requests to arbitration circuit 103 during a given turn.

In various embodiments, a category-based arbitration scheme may provide fair access to a given bank from among multiple virtual channels, while rotating among banks to avoid delays relating to accessing the same bank in quick succession.

Memory circuits 104-106, in the illustrated embodiment, each include a plurality of banks 107a-n. Memory circuits 104-106 may be implemented using any of various appropriate memory technologies. Memory circuits 104-106 may need to be refreshed periodically, e.g., if implemented as dynamic random-access memory (DRAM). Further, it may be efficient to spread out access requests to different banks, e.g., because there may be a delay between consecutive accesses to different pages of the same bank. Therefore, speaking generally, arbitration circuit 103 attempts to grant access to one of a set of banks that has not been accessed within a threshold time interval.

Example Override for Propagating Poison Indicator

Figure 2:
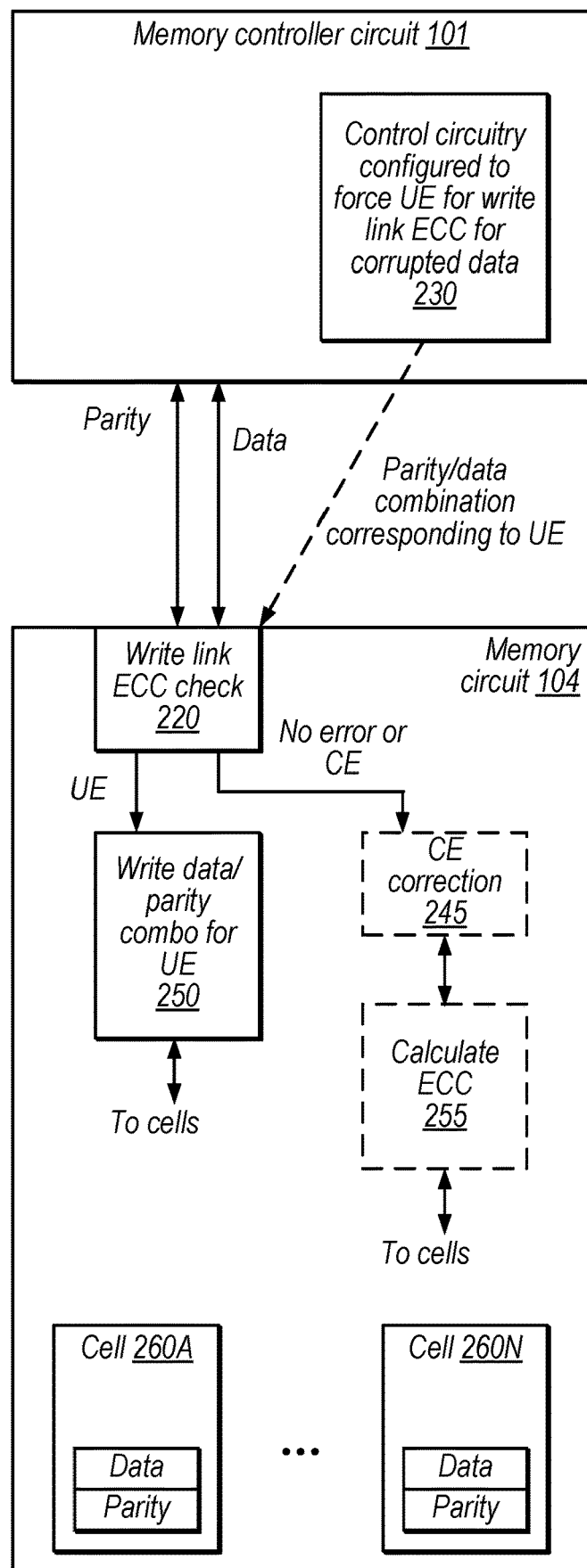
FIG. 2 is a block diagram illustrating example memory controller circuitry configured to force an uncorrectable error when writing to a memory circuit, according to some embodiments.

FIG. 2 is a block diagram illustrating memory controller circuitry configured to force an uncorrectable error when writing to a memory circuit, according to some embodiments. In the illustrated embodiment, a computing system includes memory controller circuit 101 and memory circuit 104. Note that these circuits may be manufactured separately and connected during assembly of a computing device. Memory controller circuit 101 includes control circuitry 230. Memory circuit 103 includes write link ECC check circuitry 220, circuitry 250 that is configured to write a data/parity combo for write link uncorrectable errors (UEs), CE correction circuitry 245, calculate error correction code (ECC) circuitry 255, and cells 260A-260N.

Write link ECC check 220, in the illustrated embodiment, includes circuitry configured to check parity for write data transmitted from memory controller 101. For example, circuitry 220 may generate a parity value based on received data and check that it matches a received parity value. As shown, circuitry 220 may indicate whether data transmitted over the link exhibits an uncorrectable error (UE), a correctable error (CE), or no error (NE). For correctable write link errors, CE correction circuitry 245 may correct the error. Circuitry 255 is configured to generate ECC information for data with no error or a corrected CE and store data and parity information in a memory cell 260. Elements 245 and 255 are shown using dashed lines and may be omitted in some embodiments. As shown, memory circuit 104 is configured to store data and parity information in a given memory cell 260 (note that the data and parity information may be stored using side-band or in-line techniques, depending on the memory technology of memory circuit 104).

Circuitry 250, in the illustrated embodiment, is configured to handle uncorrectable errors on the write link. In particular, circuitry 250 is configured to write a data parity combination to a cell 260 that will cause a UE when the cell is later read (e.g., by an on-chip ECC check as discussed below with reference to FIG. 3). The data and parity values may or may not match the actual data and parity received via the link from the memory controller circuit. The data and parity values written may be vendor-specific, such that the original uncorrectable data may not be stored.

Control circuitry 230, in some embodiments, is configured to override the write link ECC to force an uncorrectable error for poisoned data. For example, control circuitry 230 may write a data and parity combination over the link that intentionally causes write link ECC check circuitry 220 to detect a UE. This may propagate a poison indicator for the data such that it will persist when a read to the location in turn causes a UE. Note that the poisoned data may have become corrupted in another circuit (e.g., a cache, a link between a processor and another element, etc.) and tracking the corrupted data may avoid improper use of corrupt data. In this scenario, memory controller circuit 101 may not care about the actual value of the corrupted data.

In other embodiments, control circuitry 230 may override link ECC using other techniques. For example, rather than providing a data/parity combination that exhibits a UE, control circuitry 230 may assert a signal that indicates an override and memory circuit 104 may write a data/parity combination to a cell 260 in response to detecting the override signal.

Figure 3:
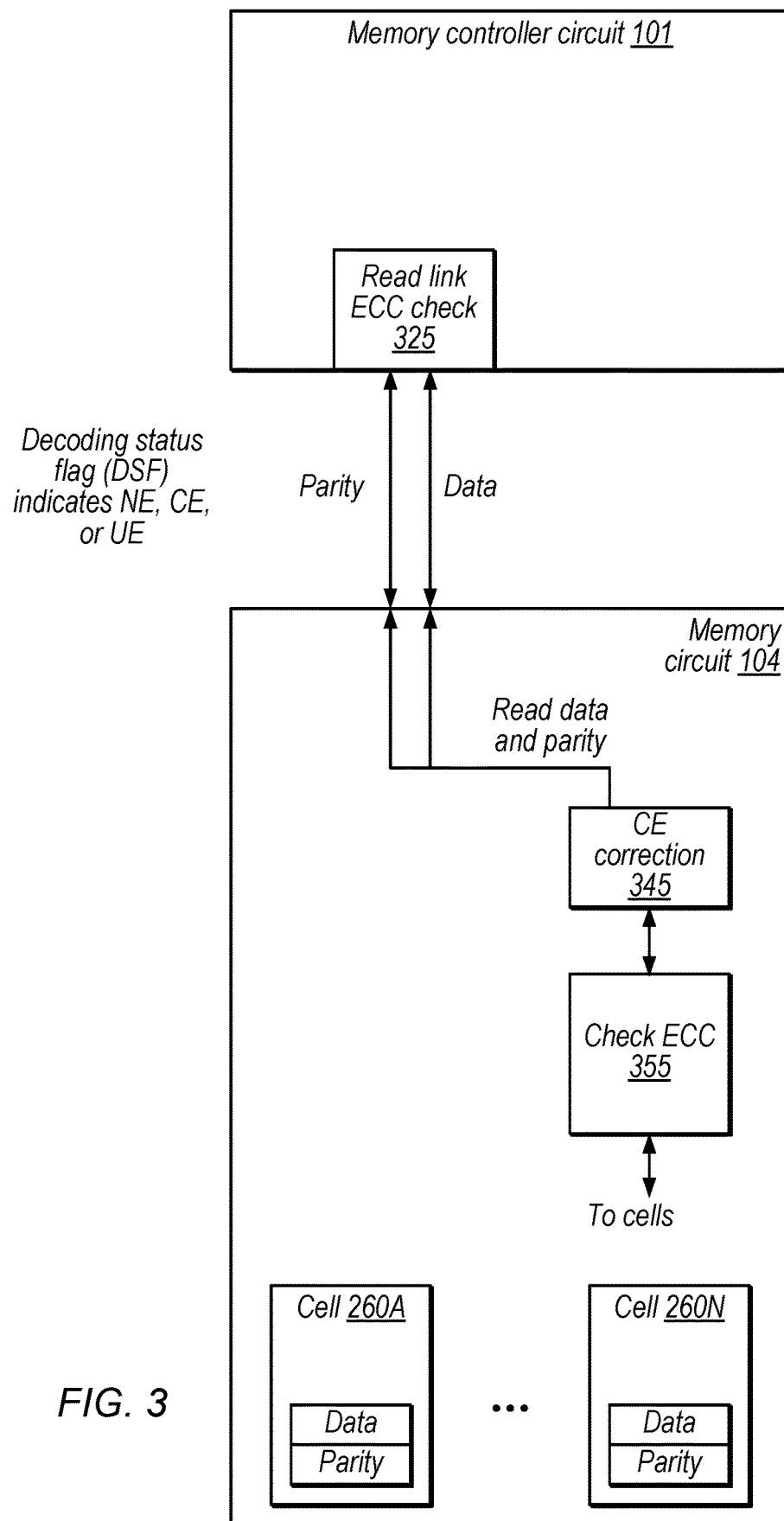
FIG. 3 is a block diagram illustrating example memory circuit elements configured to detect and correct correctable errors, according to some embodiments.

FIG. 3 is a block diagram illustrating example read link and on-chip error detection circuitry, according to some embodiments. In the illustrated embodiment, memory controller 101 includes read link ECC check circuitry 315 and memory circuit 104 includes CE correction circuitry 345 and check ECC circuitry 355.

Read link ECC check circuitry 325, in some embodiments, is configured to generate and check parity information similarly to write link ECC check circuitry 220. In some embodiments, on-chip or read link errors may be detected and reported by read link ECC check circuitry 325, as discussed in detail below.

Check ECC circuitry 355, in the illustrated embodiment, is configured to read data and parity information for a memory cell, generate a parity value based on the data, and confirm that the parity values match. CE correction circuitry 345, in the illustrated embodiment, is configured to correct CEs detected by circuitry 355. UEs may be reported via decode status flag (DSF), which may be transmitted via the same interface as the link parity information. The decode status flag, in some embodiments, allows memory circuit 104 to indicate whether it detected an error in a memory cell. Therefore, memory circuit 104 may indicate a corrected CE, a UE, or no error via the DSF for a given location. Note that various elements of a device (e.g., SoC components) may similarly detect and correct CEs.

For a UE on a read, memory controller circuit 101 may mark the data as poisoned. Similarly, UEs may be detected at various circuits of a device and result in a poison indication for that data in circuitry that supports such an indication. For a CE, memory controller circuit 101 may trigger a demand scrub operation, as discussed in detail below with reference to FIG. 5.

Note that the various error detection and correction techniques discussed herein are included for purposes of explanation but are not intended to limit the scope of the present disclosure. In other embodiments, any of various appropriate ECC or parity schemes may be implemented. Speaking generally, in the context of an ECC scheme that supports correcting CEs with up to N incorrect bits, errors on more than N bits may correspond to a UE. Similarly, while separate parity and data lines are shown, any of various appropriate link interfaces may be implemented in other embodiments and these fields may share an interface.

Note that, in some cases, the memory circuit 104 may be the original source of an uncorrectable error that caused a poison indicator in memory controller 101. This may raise the question of whether the poison indicator will be propagated on a rewrite of the data to a known-faulty cell. If this is a soft or transient memory error, the poisoned uncorrectable error may be propagated when the data is rewritten to the cell. If this is a hard or persistent memory circuit error, there are two possibilities. First, a rewrite to the cell may still store a data/parity combination that corresponds to an uncorrectable error and the propagation of the poison indicator is safe. Second, the cell may end up storing a data/parity combination that corresponds to a correctable error, which may not propagate the poison indication when the cell is read. In this scenario, because the error in memory circuit 104 initially caused the poison indication, then the overall error issue may be handled by software, which memory controller circuit 101 may have notified when generating the original poison indication. Further, hard memory failures may also be detected during zeroization operations in which all zeros are written to memory locations. Either detection technique may allow an operating system to offline the page, for example, to avoid further error due to the hard or persistent memory error. If the operating system is fairly pessimistic when off-lining pages in response to uncorrectable errors, it may be highly unlikely that a memory-initiated uncorrectable error will cause a failure to propagate a poison indicator.

Example Propagation of Poison Indicator

Note that overriding link ECC is one example of poison indicator propagation, but the poison indicator may be propagated throughout various circuit elements and operations, as discussed in detail below.

Figure 4:
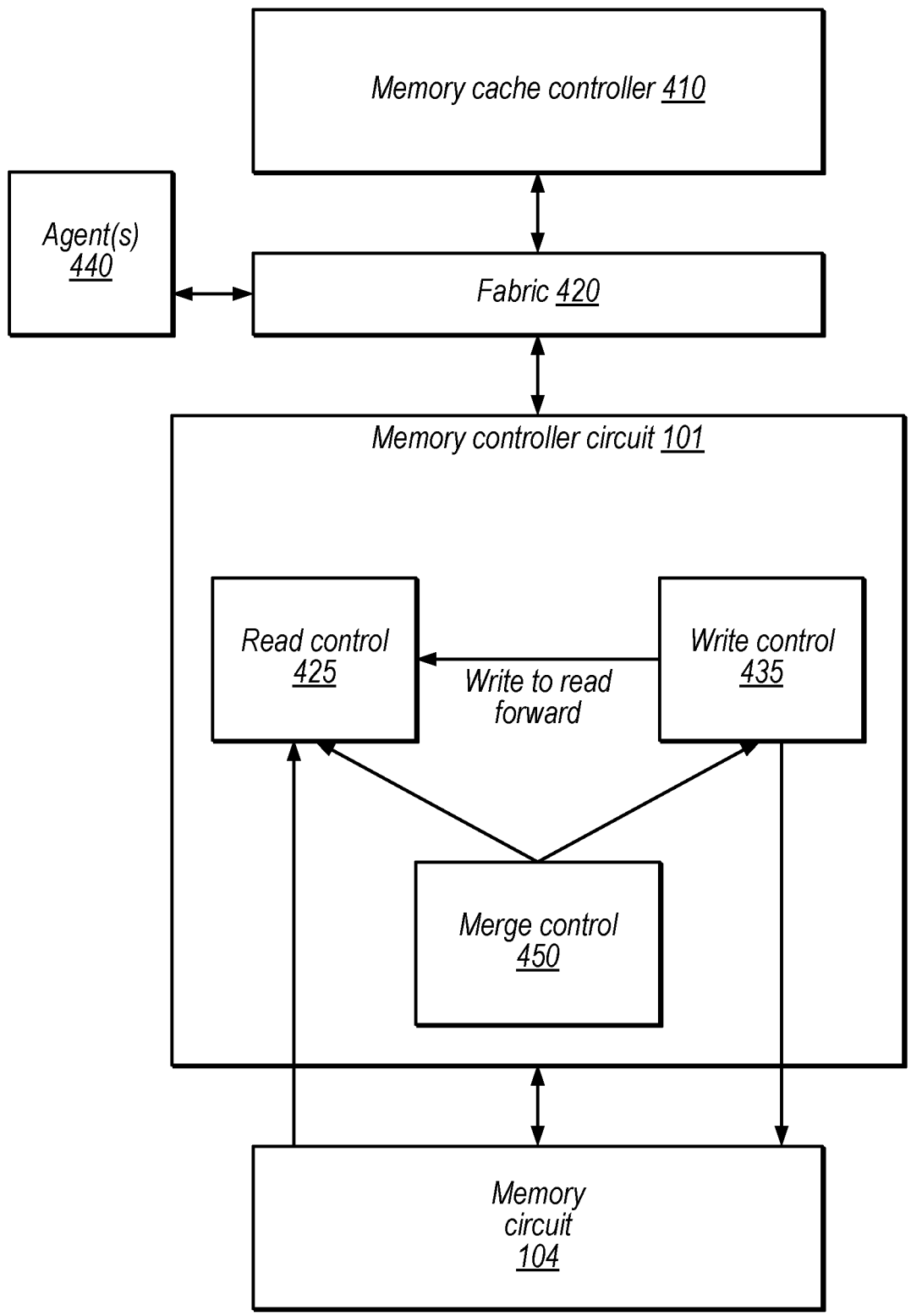
FIG. 4 is a block diagram illustrating example circuits of a system that may propagate a corruption indicator, according to some embodiments.

FIG. 4 is a block diagram showing example circuitry, e.g., in an SoC, configured to propagate a poison indication. In the illustrated example, the system includes memory controller 101, memory circuit 104, memory cache controller 410, fabric 420, and agent 440.

Various agents, the memory cache controller 410, and the memory controller circuit 101 communicate via the fabric 420. In some embodiments, the fabric may include a field (e.g., a bit) for a poison indicator for data transmitted via the fabric. This may allow circuits to propagate the poison indicator via the fabric. In other embodiments, the fabric 420 may not include a dedicated field for a poison indicator but various circuits may encode a poison indicator in data transmitted via the fabric for decoding by a receiving circuit.

Memory cache controller 410 may control a memory cache, which may be a cache that is furthest from one or more processors in a cache/memory hierarchy (e.g., there may be one or more lower-level L1, L2, L3 caches, etc.). The memory cache (not shown) may be configured to write evicted data to memory circuit 104 and read data for cache misses from memory circuit 104. The memory cache controller 410 may be configured to detect data that was corrupted in the memory cache and mark the data as poisoned. The memory cache controller 410 may also be configured to maintain poison indicators for data that was corrupted elsewhere before storage in the memory cache.

Memory controller 101 may also generate a poison indicator for data based on a match of the address of the data with a channel address mask. This may allow intentional insertion of various types of errors, e.g., for debug purposes, and errors (including CEs and UEs) may be injected when receiving data from memory or writing data to memory. The masking may allow triggering on a range of addresses. This may be important for testing purposes, given that CEs are fairly uncommon and UEs are even more uncommon. Therefore, injecting errors may facilitate testing of various memory reliability features.

Memory controller 101 may also include write queue fields to track poison indicators. Memory controller 101 may perform various operations on queued accesses to improve efficiency. For example, memory controller 101 may forward write data from a write queue to a read queue entry for the same location, to avoid accessing memory circuit 104 for the read. As another example, memory controller 101 may merge accesses to improve efficiency, avoid hazards (e.g., WAW, WARAW, etc.), or both. In some embodiments, memory controller circuit 101 is configured to maintain poison indicators properly through such operations.

Agents 440 may be various circuits such as processors, graphics processors, I/O controllers, etc. Agents 440 may similarly originate or maintain poison indicators for data that they process.

Consider the following example path that data may take through the system. A data block may be flagged as poisoned by the memory cache controller 410 based on an error in the memory cache. The poison indicator may be communicated to memory controller 101, via fabric 420, in conjunction with a write of the data to memory. Memory controller 101 may combine the poison indicator with any poison indicator generated due to a channel address mask (e.g., by indicating poisoning if either poison indicator is set). Memory controller 101 may propagate the poison indicator to write queue circuitry with the write data. For any write to read forwarding from the write queue entry to the read queue, memory controller 101 may similarly propagate the poison indicator. For any access merging operations, memory controller 101 may similarly propagate any poison indicators for the merged data to the merged operation. The write link override may result in data corresponding to an uncorrectable error being stored in the memory cell. When later read, memory controller circuit 101 may mark the data as poisoned in response to detecting a DSF value for an uncorrectable error, and the poison indicator may propagate to various circuitry in the system.

Relative to the memory controller circuit maintaining dedicated information regarding which memory cells are poisoned or a dedicated field in memory cells to track this information, disclosed techniques may advantageously reduce area and power consumption in the memory cache controller, while accurately propagating poison indicators.

Overview and Limitations of LPDDR5 Memory

Note that various techniques discussed herein may be particularly relevant in the context of LPDDR5 memory circuits, although similar techniques may be used for various memory technologies. Generally, LPDDR5 memory may provide good performance for various applications (e.g., mobile devices) with relatively low power consumption. This memory technology and these applications may not incorporate various memory reliability features that are implemented in other contexts such as server applications that incorporate substantial redundancy and ECC functionality. The following discussion sets out certain LPDDR5 features that may be relevant to the present disclosure.

The fifth generation of the Low-Power Double Data Rate (LPDDR) SDRAM technology was initially released in the first half of 2019. It succeeds its predecessor, LPDDR4/4X, and offers speeds of up to 6400 Mbps (1.5 times faster). Further, by implementing several power-saving advancements, LPDDR5 may provide a power reduction of up to 20% over previous generations. LPDDR5 may provide a link ECC scheme, a scalable clocking architecture, multiple frequency-set point (FSP's), decision feedback equalization (DFE) to mitigate inter-symbol interference (ISI), write-X functionality, a flexible bank architecture, and inline on-chip ECC. LPDDR5 systems typically do not offer server-level reliability features such as single-device data correction (SDDC), memory mirroring and redundancy, demand scrubbing, patrol scrubbing, data poisoning, redundant links, clock and power monitoring/redundancy/failover, CE isolation, online sparing with automatic failover, double device data correction (DDDC), etc.

Example Demand Scrub Circuitry

In some embodiments, memory circuit 104 is configured to detect correctable errors in memory cell data and correct the errors before providing read data to memory controller 101. The erroneous data may remain uncorrected in the memory cell, however. There may be an increased likelihood of an uncorrectable error for such data. For example, if the system is configured to correct single-bit errors but is not able to correct multiple-bit errors (or more generally, is not able to correct errors above a threshold number of bit errors), then data that already exhibits a correctable error may be more likely to be further corrupted to exhibit an uncorrectable error.

Therefore, in some embodiments, memory controller circuit 101 is configured to perform demand scrubs to cause the memory circuit 104 to correct the data stored in a memory cell. Memory circuit 104 may support one or more types of write operations to efficiently perform a correction.

Figure 5:
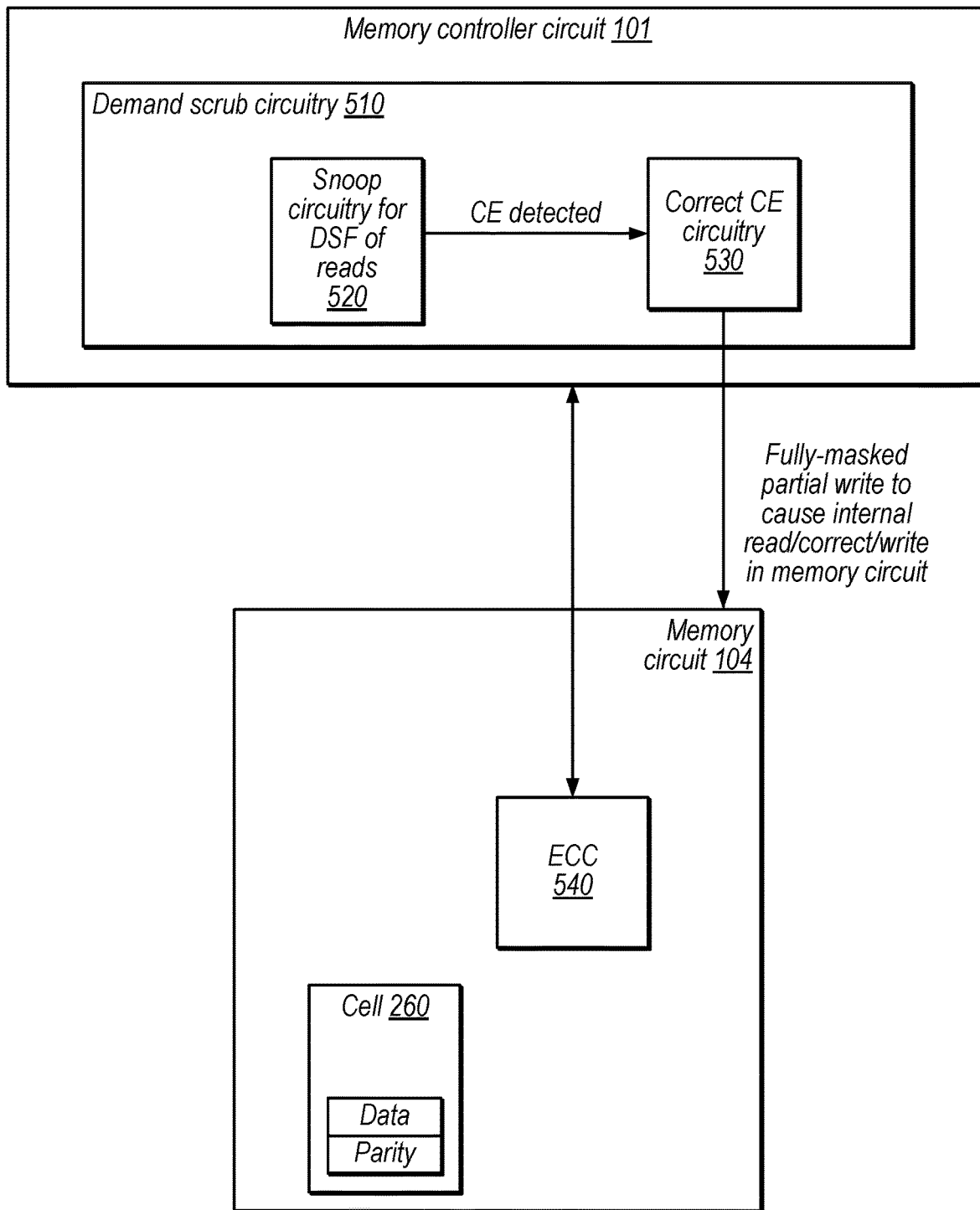
FIG. 5 is a block diagram illustrating a memory controller circuit that includes demand scrub circuitry, according to some embodiments.

FIG. 5 is a block diagram illustrating example demand scrub circuitry, according to some embodiments. In the illustrated embodiment, memory controller 101 includes demand scrub circuitry 510, which in turn includes snoop circuitry 520 and correct CE circuitry 530. The remaining elements of FIG. 5 may be configured as discussed above for similarly-numbered elements of the prior figures.

Demand scrub circuitry 510, in the illustrated embodiment, is configured to detect corrected errors from memory circuit 104 and trigger the memory circuit 104 to correct the errors. Specifically, in the illustrated embodiment, snoop circuitry 510 is configured to snoop the DSF status of read operations performed by memory controller 101. When memory circuit 104 detects and corrects a CE, the DSF associated with the data will indicate that a CE was corrected. DSF is one example encoding that may be used for LPDDR5 but is not intended to limit the scope of the present disclosure. Generally, snoop circuitry may utilize any of various appropriate fields to determine when memory circuit 104 corrected an error in a memory cell without updating the memory cell to the corrected value. In some embodiments, snoop circuitry 520 collects a DRAM channel address corresponding to each detected CE.

In response to detecting a CE, the snoop circuitry 520 informs correct CE circuitry 530, which triggers an internal correction in memory circuit 104. In the illustrated example, the trigger is a fully-masked partial write to the location that exhibited the CE, which causes an internal read/correct/write for that memory cell in memory circuit 104 (without changing the correct value of the data). Generally, memory circuit 104 may support a command such as a fully-masked partial write operation that indicates to read a location, correct a CE for that location, and write the corrected value back to the location.

Disclosed techniques may allow simplification of memory circuit 104 relative to memory circuits with built-in scrubbing while still providing demand scrub functionality in some scenarios.

In some embodiments, multiple demand scrub corrections of the same location may indicate a faulty memory cell, and the operating system may offline a corresponding page. For transient or soft errors, however, the demand scrub techniques discussed herein may reduce the rate at which CEs in a memory circuit cell become UEs.

Demand scrub functionality may be programmable, e.g., to disable demand scrub. In some embodiments, demand scrub may not be performed in one or more modes in which DSF is disabled. In some embodiments, the status of demand scrub may be locked such that it cannot be changed after boot.

Note that demand scrub operations may be arbitrated with other access operations by memory controller circuit 101. In some embodiments, demand scrub operations have a relatively lower quality-of-service (QoS) level or class than one or more other types of traffic, which may reduce or avoid interfering with the QoS for that traffic. In some situations, demand scrub operations may be dropped. In some embodiments, snoop circuitry may track information for multiple CEs at a time but may allow only a threshold number of demand scrub operations to be in-flight at a given time (e.g., one).

In some embodiments, demand scrub circuitry 510 includes a forward progress counter that accumulates over time and may increase the priority of a demand scrub operation when it reaches a threshold value.

In some embodiments, demand scrub circuitry 510 includes a timeout timer that it starts when a demand scrub write is enqueued in the write queue and which may force a write turn when the timeout timer reaches a threshold value. Demand scrub circuitry 510 may also disable demand scrubbing in response to certain operation conditions, such as the write queue already having a threshold number of valid entries.

In some embodiments, data associated with demand scrub writes is not software accessible (e.g., the data is internally read, corrected, and written in the memory circuit 104). In some embodiments, demand scrub operations are not controlled by software, but are entirely hardware controlled (e.g., snoop circuitry 520 and correct CE circuitry 530 may operate according to a finite state machine).

In some embodiments, demand scrub circuitry 510 is configured to log demand scrub operations. For example, demand scrub circuitry 510 may include software-accessible configuration registers that indicate a count of DSF with CE status (which may be maintained independently for different lanes), a count of successfully completed demand scrub writes, and a count of demand scrub writes that were dropped. These counters may be zeroed at reset, by software, or both. In some embodiments, the counters are available only in a debug mode of operation. As used herein, the term "software" broadly refers to program instructions executed by one or more processors and includes user applications, firmware, an operating system, etc.

Example Error Tracking Techniques

Figure 6:
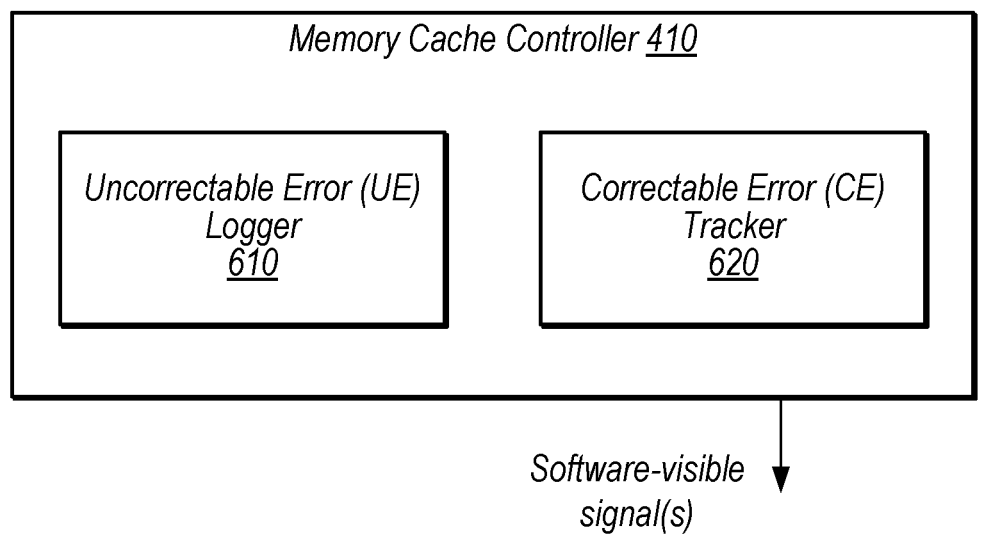
FIG. 6 is a block diagram illustrating an example memory cache controller configured to track uncorrectable errors and correctable errors, according to some embodiments.

FIG. 6 is a block diagram illustrating an example memory cache controller configured to track and log correctable and uncorrectable errors and output software-visible signaling, according to some embodiments. In the illustrated embodiment, memory cache controller 410 includes uncorrectable error (UE) logger 610 and correctable error (CE) tracker 620.

UE logger 610, in the illustrated embodiment, is configured to log detected memory errors and track certain information (e.g., physical address, error source, client identifier, etc., as discussed in detail below). In the illustrated embodiment, UE logger 610 is specifically configured to log detected uncorrectable memory errors. In some embodiments, UE logger 610 tracks the sources of uncorrectable errors. In some embodiments, UE logger 610 does not aggregate addresses and is not content addressable.

CE tracker 620, in the illustrated embodiment, is configured to log detected memory errors and track certain information (e.g., physical address, count of errors at that address, client identifier, etc.). In the illustrated embodiment, CE tracker 620 is specifically configured to log detected correctable memory errors. In some embodiments, CE tracker 620 implements a count field which indicates the number of correctable errors that have occurred that correspond to a given physical address. In some embodiments, CE tracker 620 aggregates addresses and is content addressable.

In the illustrated embodiment, memory cache controller 410 is configured to generate software-visible signal(s). These signals may inform software of tracker/logger contents, that a threshold relating to the contents has been met, or generally to indicate to software that certain action may need to be taken (e.g., to clear entries, to mark data as poisoned, offline a page, etc.).

Note that in other embodiments, a device may implement disclosed logging/tracking circuitry in other locations in addition to or in place of memory cache controller 410. Tracking in memory cache controller 410 may be particularly advantageous, however, because the memory cache controller may operate using physical memory channel addresses. This information may not be available to other circuits, so tracking at the memory cache controller may provide detailed information to software while avoiding a need to transmit this information to other circuit elements.

Generally, disclosed tracking structures may advantageously provide various useful information to software that is not available in traditional implementations, which may allow software to take appropriate corrective actions when errors are detected.

Figure 7:
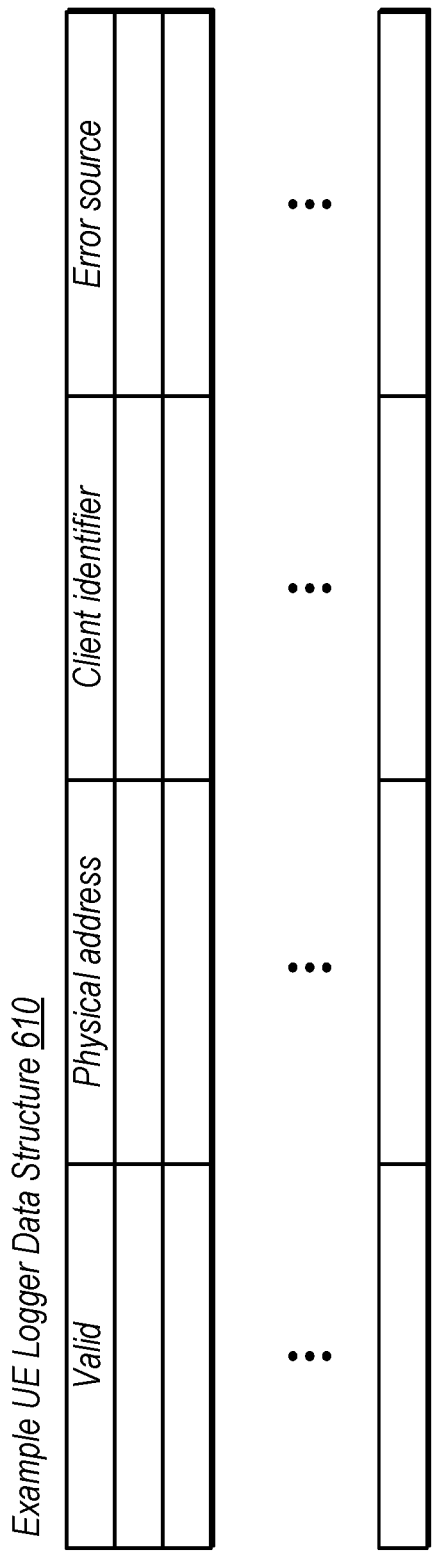
FIG. 7 is a generalized diagram illustrating an example uncorrectable error logger data structure, according to some embodiments.

FIG. 7 is a diagram illustrating an example UE logger data structure configured to log uncorrectable memory errors, according to some embodiments. In the illustrated embodiment, example UE logger data structure 610 includes valid, physical address, client identifier, and error source fields.

In the illustrated embodiment, the valid field indicates whether a data entry is valid. In some embodiments, all entries in UE logger data structure 610 are initially set to invalid.

In the illustrated embodiment, the physical address field contains memory address information about a data entry that enables a data bus to access a particular storage cell of memory. This information may be particularly useful when a memory cell is the source of an error.

In the illustrated embodiment, the client identifier field identifies the client circuitry in a SoC that previously accessed the data. For example, this field may indicate the client's fabric identifier for a communications fabric.

In the illustrated embodiment, the error source field contains address information about a data entry that identifies the source of the memory error. Non-limiting example error sources that may be encoded include: a UE from a DRAM read, memory cache read data with an uncorrectable error (based on an error check or a poison indicator), or snoop response poisoned data (e.g., when a snoop to another cache determines that the other cache controls the location and has marked the data as poisoned).

In some embodiments, an overflow signal (e.g., a bit) is asserted when there are no free entries in the UE logger and a UE is detected. In some embodiments, the overflow bit may be sticky and persistent until it is cleared (e.g., via a write-1-to-clear operation). Software may initiate a corrective action based on the overflow signal to mitigate corruption risks associated with the inability to log subsequent UEs.

In some embodiments, software may invalidate an entry, e.g., via a write-1-to-clear operation, after it has read the entry from the UE logger data structure 610.

Figures 8A, 8B:
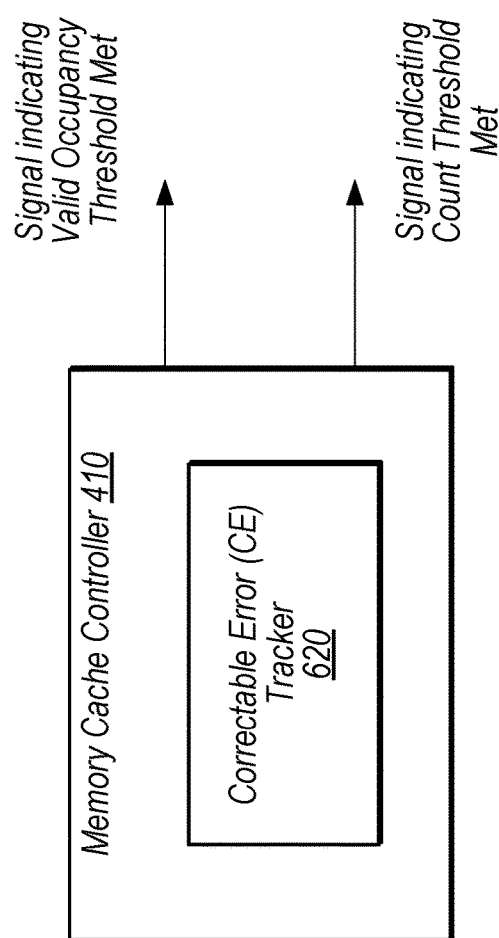
FIG. 8A is a generalized diagram illustrating an example correctable error data structure, according to some embodiments.
FIG. 8B is a block diagram illustrating an example memory cache controller configured to output a first signal and a second signal, according to some embodiments.

FIG. 8A is a diagram illustrating an example CE tracker data structure configured to track correctable memory errors, according to some embodiments. In the illustrated embodiment, example CE tracker data structure 620 includes valid, physical address, client identifier, and count fields.

The valid, physical address, and client identifier fields may track similar information to that described above in the context of the UE logger data structure 610. In some embodiments, CE tracker 620 utilizes a content-addressable memory (CAM) structure in which at least a portion of physical addresses are used as tags to determine whether there is a hit on a valid entry and increase its count, as discussed below with reference to FIG. 9.

In the illustrated embodiment, the count field indicates the number of correctable errors detected for a respective physical address in the interval after that entry was last cleared.

FIG. 8B is a block diagram illustrating an example memory cache controller configured to track CE errors and output signals based on certain thresholds being met or exceeded. In the illustrated embodiment, memory cache controller 410 contains CE tracker 620, and outputs a first signal corresponding to a valid occupancy threshold and a second signal corresponding to a count threshold.

In the illustrated embodiment, control circuitry is configured to assert the signal indicating the valid occupancy threshold when the number of valid entries in the CE tracker 620 meets a threshold. Note that "meeting" a threshold may correspond to equaling the threshold or crossing the threshold (e.g., having a value that is one step greater than or one step less than the threshold) in different implementations.

In the illustrated embodiment, control circuitry is configured to assert the signal indicating a count threshold when a particular physical address's count field in CE tracker 620 reaches a value that meets the count threshold.

Software may perform various corrective actions based on these signals, including halting certain activity when the valid occupancy threshold is met or accessing one or more CE tracker entries when the count threshold is met.

Example Techniques for Allocating and Deallocating CE Tracker Entries

Figure 9:
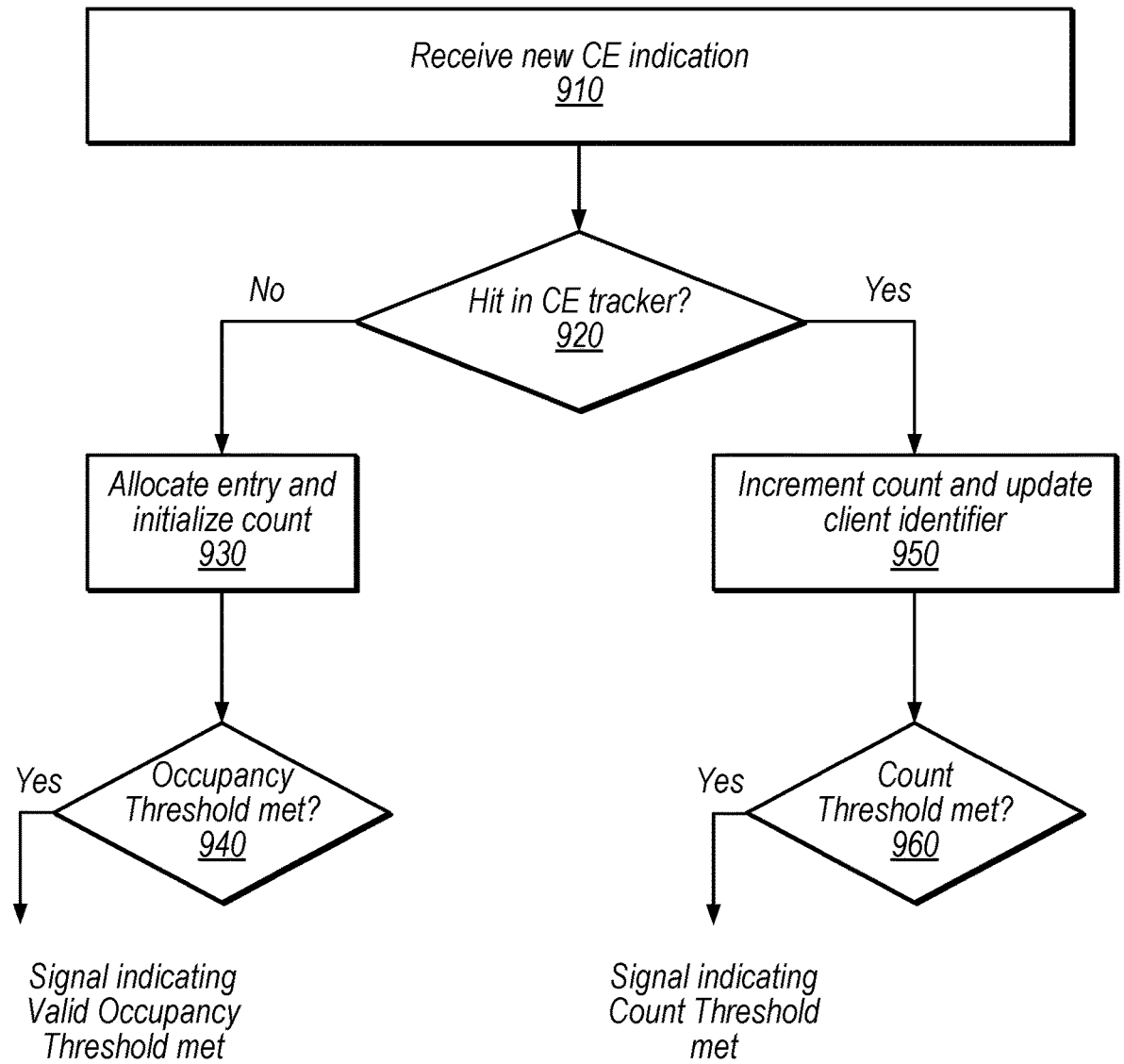
FIG. 9 is a flow diagram illustrating an example method for generating signals based on tracked correctable errors, according to some embodiments.

FIG. 9 is a flow diagram illustrating an example method for allocating a new CE. The method shown in FIG. 9 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 910, in the illustrated embodiment, control circuitry (e.g., of memory cache controller 410) receives a new CE.

At 920, in the illustrated embodiment, the control circuitry determines whether the new CE hits or misses in the CE tracker. For a hit, flow proceeds to 950 while for a miss, flow proceeds to 930.

At 930, in the illustrated embodiment, for a miss in the CE tracker, control circuitry allocates an entry in the CE tracker for the new CE and initializes its count (e.g., to 1 or a default value).

At 940, in the illustrated embodiment, control circuitry determines whether an occupancy threshold is met (e.g., if the number of valid entries in the CE tracker meets the occupancy threshold after allocating the entry at 930). If so, the control circuitry asserts a signal indicating that the valid occupancy threshold has been met.

In some embodiments, in response to the signal, software takes a snapshot of visible valid entries, and may clear entries to clear space in the CE tracker. In some embodiments, when there are no free entries in the CE tracker, new CE's may not be tracked. Note that entries may not be software-visible in certain situations. For example, control circuitry may allow software to access all or a portion of the entries only after one of the disclosed thresholds has been hit.

At 950, in the illustrated embodiment, for a hit in the CE tracker, control circuitry increments the count value for the entry that was hit and updates that entry's client identifier to the most recent client associated with the error. In other embodiments, the client identifier field may track multiple client identifiers and the control circuitry may add the most recent client identifier to a list of identifiers.

At 960, in the illustrated embodiment, control circuitry determines whether a count threshold has been met due to the increment at 950. If so, the control circuitry asserts a signal indicating the count threshold has been met. In some embodiments, such a signal may warn software of a potential bad DRAM cell, which may allow the software to take various actions such as off-lining a page that includes the cell.

Figure 10:
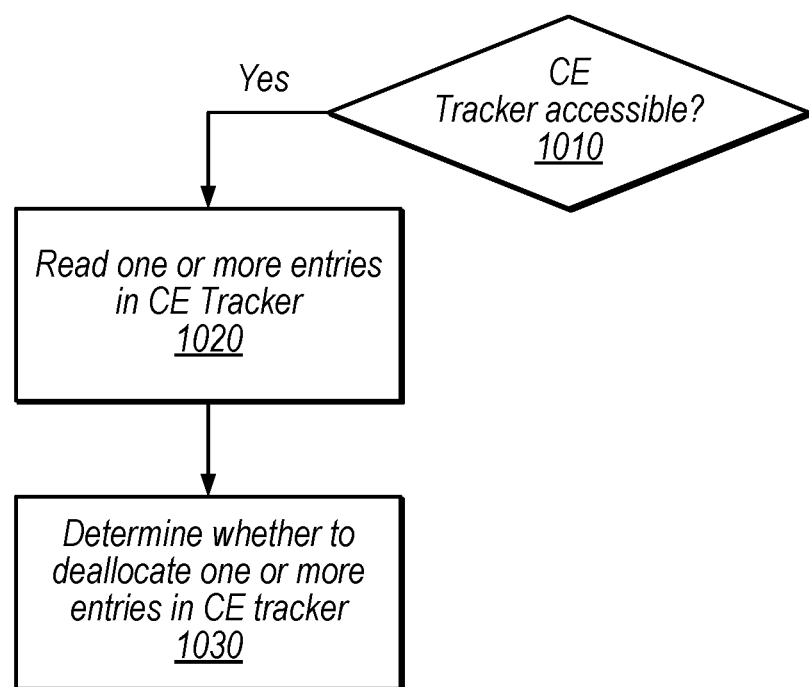
FIG. 10 is a flow diagram illustrating an example method for deallocating correctable error tracker entry, according to some embodiments.

FIG. 10 is a flow diagram illustrating an example method for deallocating a CE tracker entry. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, control circuitry determines whether the CE tracker is accessible by software. If so, flow proceeds to 1020. If not, the control circuitry may take no further action.

At 1020, in the illustrated embodiment, upon verification that the CE tracker is accessible by software, the control circuitry reads one or more entries. In some embodiments, a protocol is initiated to take a snapshot of all visible valid entries in the CE tracker structure.

At 1030, in the illustrated embodiment, the control circuitry determines whether to deallocate one or more entries in the CE tracker. In some embodiments, deallocation is performed by software, e.g., using a write-1-to-clear mechanism.

In some embodiments, deallocation of one or more entries in the CE tracker is at the discretion of software. Software has the option to not deallocate an entry. Software may move CE tracker information to another data structure to make space available in the CE tracker, according to some embodiments. This may be useful in situations where there are a significant number of unique CE addresses or if thresholds are reduced, for example.

Example Methods

Figure 11:
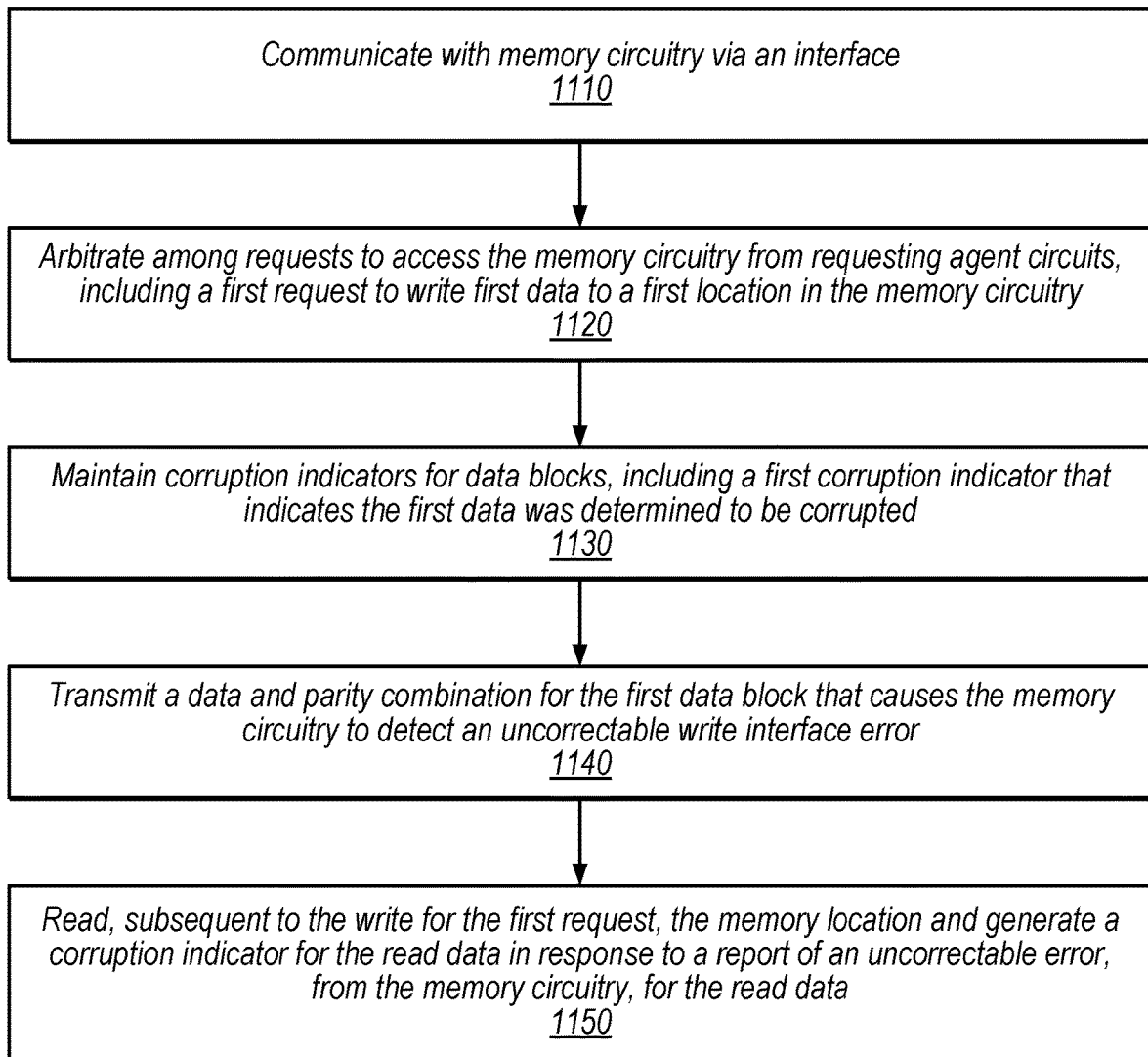
FIG. 11 is a flow diagram illustrating another example method, according to some embodiments.

FIG. 11 is a flow diagram illustrating an example method for tracking corrupt data, according to some embodiments. The method shown in FIG. 11 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1110, in the illustrated embodiment, memory controller circuitry communicates with memory circuitry via an interface. The memory circuitry may implement both link error correction and on-die error correction. In some embodiments, wherein the memory circuitry supports error detection for the interface (e.g., write link ECC) that causes a write, for a detected uncorrectable write interface error, a data and parity combination to a target memory location, where the combination corresponds to an error that is not correctable.

At 1120, in the illustrated embodiment, the memory controller circuitry arbitrates among requests to access the memory circuitry from requesting agent circuits, including a first request to write first data to a first location in the memory circuitry.

At 1130, in the illustrated embodiment, the memory controller circuitry maintains corruption indicators for data blocks, including a first corruption indicator that indicates the first data was determined to be corrupted. In some embodiments, one of the agent circuits is configured to generate the first corruption indicator, e.g., based on a detected UE.

In some embodiments, the device that includes the memory controller circuitry is configured to maintain corruption indicators through multiple operations, including any combination of the following operations: propagation of a corruption indicator after merging one or more requests to resolve a hazard, propagation of a corruption indicator for a write to read forwarding operation from a write queue, translation of a corruption indicator to a forced uncorrectable write interface error, communication by memory cache controller circuitry to the memory controller circuitry of a corruption indicator, and propagation of a corruption indicator determined based on an address mask.

At 1140, in the illustrated embodiment, the memory controller circuitry transmits a data and parity combination for the first data block that causes the memory circuitry to detect an uncorrectable write interface error.

At 1150, in the illustrated embodiment, the memory controller circuitry reads, subsequent to the write for the first request, the memory location and generates a corruption indicator for the read data in response to a report of an uncorrectable error, from the memory circuitry, for the read data.

In some embodiments, demand scrub circuitry is configured to detect corrected errors indicated by the memory circuitry for which incorrect data is still stored in a memory cell of the memory circuitry and, in response to detecting a corrected error, initiate a demand scrub write operation to the memory circuitry that causes an internal read, error correction of the correctable error, and write of the corrected data in the memory circuitry. In some embodiments, the write operation is a fully-masked partial write operation to a detected DRAM address of the corrected error. In some embodiments, the demand scrub circuitry is configured to log, in one or more software-accessible registers: number of detected correctable errors and number of successful demand scrub writes. In some embodiments, the detection of corrected errors is based on a decode status flag reported by the memory circuitry that indicates whether provided data has no error, a correctable error, or an uncorrectable error.

In some embodiments, the memory circuitry includes error circuitry configured to, for write operations, confirm parity information for write data with no error and correct a detected correctable error associated with the interface. In some embodiments, the memory circuitry includes error circuitry configured to, for read operations, correct a detected error associated with the read location and report a detected uncorrectable error associated with the read location via the interface.

Figure 12:
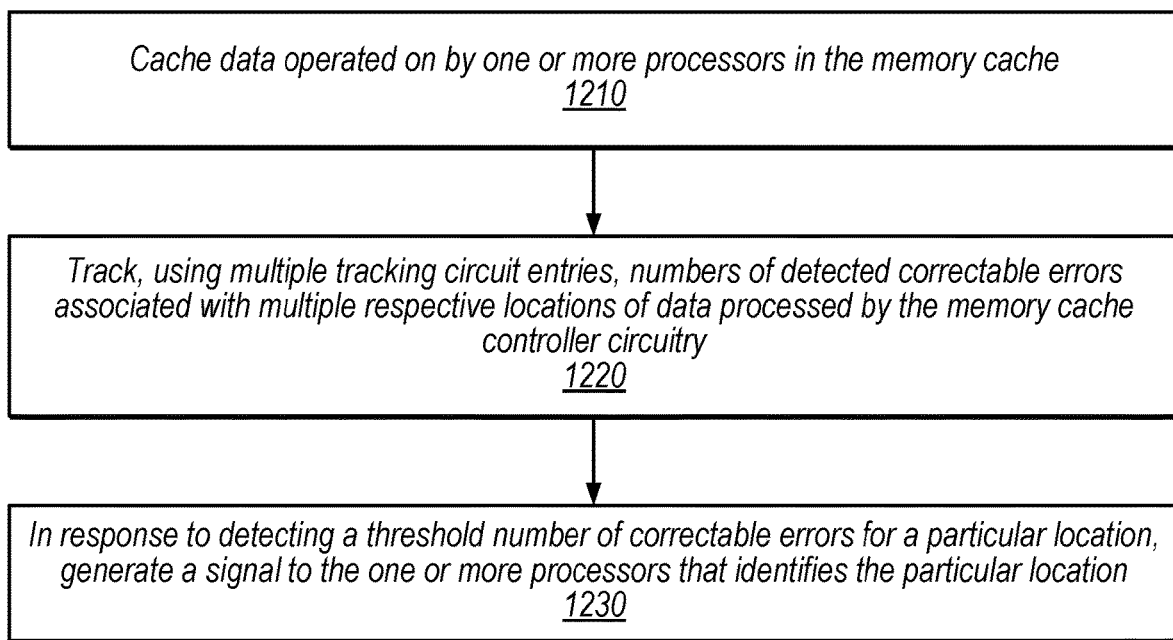
FIG. 12 is a flow diagram illustrating another example method, according to some embodiments.

FIG. 12 is a flow diagram illustrating an example method for tracking numbers of detected correctable errors, according to some embodiments. The method shown in FIG. 12 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1210, in the illustrated embodiment, data operated on by one or more processors in the memory cache is cached.

At 1220, in the illustrated embodiment, numbers of detected correctable errors associated with multiple respective locations are tracked using multiple tracking circuit entries.

At 1230, in the illustrated embodiment, in response to detecting a number of correctable errors for a particular location, a signal is generated to the one or more processors that identifies the particular location.

In some embodiments, a signal that identifies a particular location is asserted to indicate a count threshold has been hit. The signal may warn software that a page exists that potentially has bad DRAM in it that could be close to failure.

In some embodiments, in response to a number of valid entries in the tracking circuit entries matching or exceeding an occupancy threshold, an alert signal is generated. In some embodiments, in response to matching or exceeding the occupancy threshold, software is enabled to access one or more tracking circuit entries.

In some embodiments, in response to software signaling, one or more of the tracking circuit entries may be deallocated.

In some embodiments, the multiple circuit entries include respective client identifier fields that indicate a client associated with a given correctable error. In some embodiments, detected UEs associated with multiple respective locations of data are tracked using multiple UE tracking circuit entries.

In some embodiments, the UE tracking circuit entries include a source field that identifies a source of a given UE. In some embodiments, the source field is configured to encode sources that include at least the following sources: a memory error, a memory cache error, and a snoop response. In some embodiments, the multiple UE tracking circuit entries are not tagged and the multiple tracking circuit entries are tagged with at least a portion of an address for a given location.

In some embodiments, the device is configured to maintain corruption indicators for data blocks, where a corruption indicator indicates that a data block was determined to be corrupted.

Example Device

Figure 13:
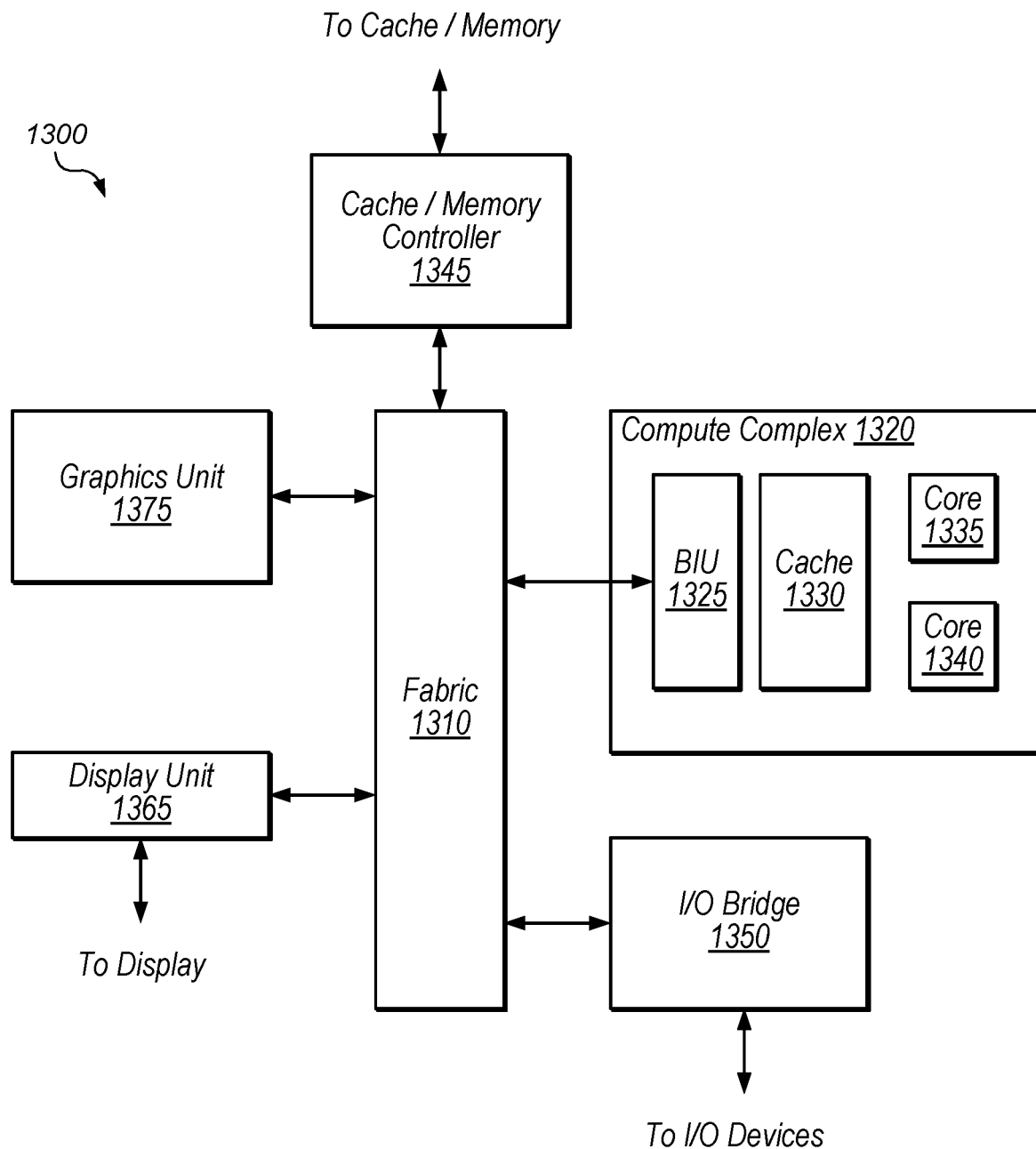
FIG. 13 is a block diagram illustrating an example computing device, according to some embodiments.

Referring now to FIG. 13, a block diagram illustrating an example embodiment of a device 1300 is shown. In some embodiments, elements of device 1300 may be included within a system on a chip. In some embodiments, device 1300 may be included in a mobile device, which may be battery-powered. Therefore, power consumption by device 1300 may be an important design consideration. In the illustrated embodiment, device 1300 includes fabric 1310, compute complex 1320 input/output (I/O) bridge 1350, cache/memory controller 1345, graphics unit 13135, and display unit 1365. In some embodiments, device 1300 may include other components (not shown) in addition to or in place of the illustrated components, such as video processor encoders and decoders, image processing or recognition elements, computer vision elements, etc.

Fabric 1310 may include various interconnects, buses, MUX's, controllers, etc., and may be configured to facilitate communication between various elements of device 1300. In some embodiments, portions of fabric 1310 may be configured to implement various different communication protocols. In other embodiments, fabric 1310 may implement a single communication protocol and elements coupled to fabric 1310 may convert from the single communication protocol to other communication protocols internally.

In the illustrated embodiment, compute complex 1320 includes bus interface unit (BIU) 1325, cache 1330, and cores 1335 and 1340. In various embodiments, compute complex 1320 may include various numbers of processors, processor cores and caches. For example, compute complex 1320 may include 1, 2, or 4 processor cores, or any other suitable number. In one embodiment, cache 1330 is a set associative L2 cache. In some embodiments, cores 1335 and 1340 may include internal instruction and data caches. In some embodiments, a coherency unit (not shown) in fabric 1310, cache 1330, or elsewhere in device 1300 may be configured to maintain coherency between various caches of device 1300. BIU 1325 may be configured to manage communication between compute complex 1320 and other elements of device 1300. Processor cores such as cores 1335 and 1340 may be configured to execute instructions of a particular instruction set architecture (ISA) which may include operating system instructions and user application instructions.

Cache/memory controller 1345 may be configured to manage transfer of data between fabric 1310 and one or more caches and memories. For example, cache/memory controller 1345 may be coupled to an L3 cache, which may in turn be coupled to a system memory. In other embodiments, cache/memory controller 1345 may be directly coupled to a memory. In some embodiments, cache/memory controller 1345 may include one or more internal caches.

As used herein, the term "coupled to" may indicate one or more connections between elements, and a coupling may include intervening elements. For example, in FIG. 13, graphics unit 1375 may be described as "coupled to" a memory through fabric 1310 and cache/memory controller 1345. In contrast, in the illustrated embodiment of FIG. 13, graphics unit 1375 is "directly coupled" to fabric 1310 because there are no intervening elements.

Graphics unit 1375 may include one or more processors, e.g., one or more graphics processing units (GPU's). Graphics unit 1375 may receive graphics-oriented instructions, such as OPENGL®, Metal, or DIRECT3D® instructions, for example. Graphics unit 1375 may execute specialized GPU instructions or perform other operations based on the received graphics-oriented instructions. Graphics unit 1375 may generally be configured to process large blocks of data in parallel and may build images in a frame buffer for output to a display, which may be included in the device or may be a separate device. Graphics unit 1375 may include transform, lighting, triangle, and rendering engines in one or more graphics processing pipelines. Graphics unit 1375 may output pixel information for display images. Graphics unit 1375, in various embodiments, may include programmable shader circuitry which may include highly parallel execution cores configured to execute graphics programs, which may include pixel tasks, vertex tasks, and compute tasks (which may or may not be graphics-related).

Display unit 1365 may be configured to read data from a frame buffer and provide a stream of pixel values for display. Display unit 1365 may be configured as a display pipeline in some embodiments. Additionally, display unit 1365 may be configured to blend multiple frames to produce an output frame. Further, display unit 1365 may include one or more interfaces (e.g., MIPI® or embedded display port (eDP)) for coupling to a user display (e.g., a touchscreen or an external display).

I/O bridge 1350 may include various elements configured to implement: universal serial bus (USB) communications, security, audio, and low-power always-on functionality, for example. I/O bridge 1350 may also include interfaces such as pulse-width modulation (PWM), general-purpose input/output (GPIO), serial peripheral interface (SPI), and inter-integrated circuit (I2C), for example. Various types of peripherals and devices may be coupled to device 1300 via I/O bridge 1350.

In some embodiments, device 1300 includes network interface circuitry (not explicitly shown), which may be connected to fabric 1310 or I/O bridge 1350. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1300 with connectivity to various types of other devices and networks.

Various elements of FIG. 13 may utilize disclosed techniques. For example, memory cache controller 410, memory controller circuit 101, or both may be included in element 1345. Fabric 1310 may support corruption indicators. Various agent circuits such as graphics unit 1375, compute complex 1320, etc. may detect data poisoning and propagate a poison indicator. Disclosed techniques may advantageously improve memory reliability, in various embodiments.

Example Applications

Figure 14:
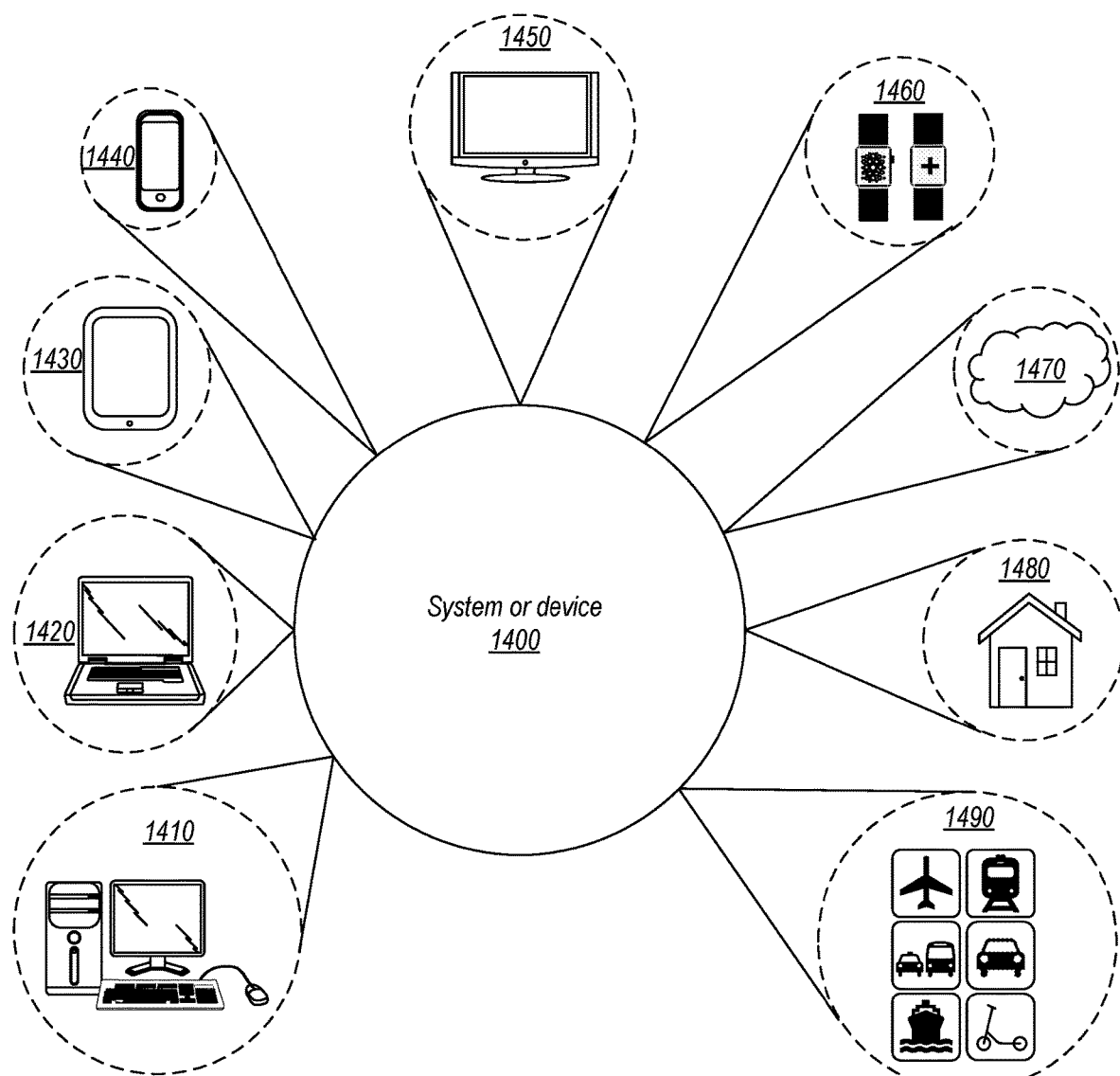
FIG. 14 is a diagram illustrating example applications of disclosed systems and devices, according to some embodiments.

Turning now to FIG. 14, various types of systems that may include any of the circuits, devices, or system discussed above. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 14130. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 15:
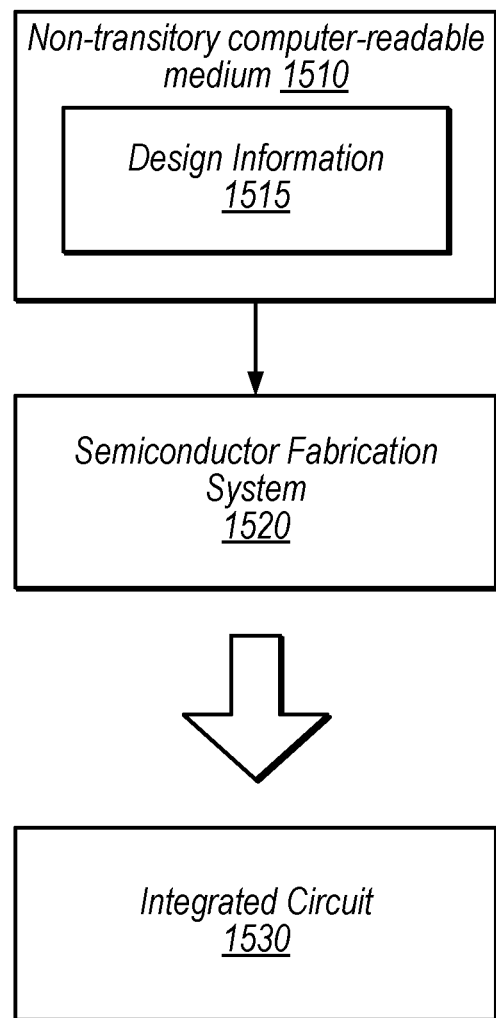
FIG. 15 is a block diagram illustrating an example computer-readable medium that stores circuit design information, according to some embodiments.

FIG. 15 is a block diagram illustrating an example non-transitory computer-readable storage medium that stores circuit design information, according to some embodiments. In the illustrated embodiment semiconductor fabrication system 1520 is configured to process the design information 1515 stored on non-transitory computer-readable medium 1510 and fabricate integrated circuit 1530 based on the design information 1515.

Non-transitory computer-readable storage medium 1510, may comprise any of various appropriate types of memory devices or storage devices. Non-transitory computer-readable storage medium 1510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well or combinations thereof. Non-transitory computer-readable storage medium 1510 may include two or more memory mediums which may reside in different locations, e.g., in different computer systems that are connected over a network.

Design information 1515 may be specified using any of various appropriate computer languages, including hardware description languages such as, without limitation: VHDL, Verilog, SystemC, SystemVerilog, RHDL, M, MyHDL, etc. Design information 1515 may be usable by semiconductor fabrication system 1520 to fabricate at least a portion of integrated circuit 1530. The format of design information 1515 may be recognized by at least one semiconductor fabrication system 1520. In some embodiments, design information 1515 may also include one or more cell libraries which specify the synthesis, layout, or both of integrated circuit 1530. In some embodiments, the design information is specified in whole or in part in the form of a netlist that specifies cell library elements and their connectivity. Design information 1515, taken alone, may or may not include sufficient information for fabrication of a corresponding integrated circuit. For example, design information 1515 may specify the circuit elements to be fabricated but not their physical layout. In this case, design information 1515 may need to be combined with layout information to actually fabricate the specified circuitry.

Integrated circuit 1530 may, in various embodiments, include one or more custom macrocells, such as memories, analog or mixed-signal circuits, and the like. In such cases, design information 1515 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 is configured to operate according to a circuit design specified by design information 1515, which may include performing any of the functionality described herein. For example, integrated circuit 1530 may include any of various elements shown in FIGS. 1-8, and 13. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
    memory circuitry that includes:
        memory cells configured to store data;
        interface circuitry that includes a first interface configured to transmit data and a second interface configured to transmit parity information for the data;
        on-die error correcting code (ECC) circuitry configured to:
            check read data from the memory cells for errors; and
            correct detected correctable errors to generate corrected data;
        link ECC circuitry configured to transmit link parity information via the second interface;
    wherein the memory circuitry is configured to:
        provide read data to a requesting circuit via the first interface, including one or more sets of corrected data from the on-die ECC circuitry; and
        provide a decoding status flag (DSF), including to:
            set the DSF to a first value in response to no error being detected for a given set of provided read data;
            set the DSF to a second value in response to a correctable error that was detected and corrected by the on-die ECC circuitry to provide a given set of read data;
            set the DSF to a third value in response to an uncorrectable error detected by the on-die ECC circuitry; and
            transmit the DSF via the same second interface as the link parity information.

2. The apparatus of claim 1, wherein the memory circuitry is an LPDDR5 circuit.

3. The apparatus of claim 1, wherein the on-die ECC circuitry is configured to correct single-bit errors but not multi-bit errors.

4. The apparatus of claim 1, wherein the memory circuitry is configured to disable DSF reporting in one or more modes of operation.

5. The apparatus of claim 1, wherein the memory circuitry is configured to perform a requested masked write operation to read data from a specified memory cell, correct one or more correctable errors in the read data from the specified memory cell, and write corrected data back to the specified memory cell.

6. The apparatus of claim 1, wherein the memory circuitry is configured to maintain a count of correctable errors and perform an action in response to a determination that the count meets a first threshold.

7. The apparatus of claim 6, wherein the action is a reporting-related action.

8. The apparatus of claim 6, wherein the memory circuitry is further configured to perform the action based on detection of an uncorrectable error.

9. The apparatus of claim 6, wherein the memory circuitry is further configured to:
    maintain a region-specific count of correctable errors for a memory region; and
    perform the action in response to the region-specific count meeting a second threshold.

10. The apparatus of claim 1, further comprising:
    wherein the requesting circuit is a memory controller circuit included in the apparatus and wherein the memory controller circuit is configured to receive the DSF from the memory circuitry.

11. An apparatus, comprising:
    a memory controller circuit that includes;
        interface circuitry that includes a first interface configured to configured to receive read data from a memory circuit and a second interface configured to receive parity information for the data;
        link ECC circuitry configured to receive link parity information via the second interface and check the link parity information for link errors;
        control circuitry configured to receive a decoding status flag (DSF) from the memory circuit via the same second interface as the link parity information, wherein:
            a first value of the DSF indicates that no error was detected for the read data;
            a second value of the DSF indicates that a correctable error was detected and corrected, to generate the read data, by on-die error correcting code (ECC) circuitry of the memory circuit; and
            a third value of the DSF indicates that an uncorrectable error in the read data was detected by the on-die ECC circuitry of the memory circuit.

12. The apparatus of claim 11, wherein the interface circuitry supports one or more LPDDR5 interfaces.

13. The apparatus of claim 11, wherein the control circuitry is configured to issue a masked write operation that specifies to read data from a specified memory cell, correct one or more correctable errors in the read data from the specified memory cell, and write corrected data back to the specified memory cell.

14. The apparatus of claim 11, further comprising:
    the memory circuit, wherein the memory circuit is configured to provide read data to a requesting circuit via the interface circuitry, including one or more sets of data corrected by on-die ECC circuitry.

15. A method, comprising:
    storing, by memory circuitry, data in one or more memory cells;

checking, by on-die error correcting code (ECC) circuitry of the memory circuitry, read data from the memory cells for errors;

correcting, by the on-die ECC circuitry, a detected correctable error to generate corrected data;

providing, by the memory circuitry, read data and decoding status flag (DSF) information to a requesting circuit, wherein the read data is provided via a first interface and the DSF information is provided via a second interface, including providing:
- a first value of the DSF in response to no error being detected for a first set of provided read data;
- a second value of the DSF in response to a correctable error that was detected and corrected by the on-die ECC circuitry to provide a second set of read data; and
- a third value of the DSF in response to an uncorrectable error detected by the on-die ECC circuitry; and providing, by the memory circuitry, link ECC parity information via the same second interface as the DSF information.

16. The method of claim 15, further comprising:

performing, by the memory circuitry, a masked write operation to read data from a specified memory cell, correct one or more correctable errors in the read data from the specified memory cell, and write corrected data back to the specified memory cell.

* * * * *